United States Patent
Daniel et al.

(10) Patent No.: US 10,712,440 B2
(45) Date of Patent: Jul. 14, 2020

(54) ARRAY SYSTEM FOR THE CHARACTERIZATION OF AN OBJECT

(71) Applicant: Palo Alto Research Center Incorporated, Palo Alto, CA (US)

(72) Inventors: George Daniel, Mountain View, CA (US); Bernard D. Casse, Saratoga, CA (US); Eric Cocker, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 296 days.

(21) Appl. No.: 15/597,912

(22) Filed: May 17, 2017

(65) Prior Publication Data

US 2018/0335516 A1 Nov. 22, 2018

(51) Int. Cl.
  *G01S 13/88* (2006.01)
  *H01Q 21/28* (2006.01)
  *H01Q 3/26* (2006.01)

(52) U.S. Cl.
  CPC ............. *G01S 13/885* (2013.01); *H01Q 3/26* (2013.01); *H01Q 3/267* (2013.01); *H01Q 21/28* (2013.01)

(58) Field of Classification Search
  CPC ........ G01S 13/885; H01Q 21/28; H01Q 3/26; H01Q 3/267
  USPC .......................................................... 342/22
  See application file for complete search history.

(56) References Cited

U.S. PATENT DOCUMENTS

| | | | | |
|---|---|---|---|---|
| 3,747,098 A * | 7/1973 | Kirkpatrick | ............ | H01Q 3/385 333/24.1 |
| 5,381,151 A * | 1/1995 | Boles | .................... | G01S 7/2926 342/21 |
| 7,423,578 B1 * | 9/2008 | Tietjen | ...................... | G01S 7/03 342/157 |
| 7,801,447 B1 * | 9/2010 | Williams | .................. | G01S 3/22 398/116 |
| 8,604,989 B1 * | 12/2013 | Olsen | .................. | H01Q 25/008 343/700 MS |
| 9,235,821 B2 * | 1/2016 | Nielsen | .................. | G06Q 10/00 |
| 9,413,079 B2 * | 8/2016 | Kamgaing | ........... | H01Q 21/061 |
| 9,551,785 B1 * | 1/2017 | Geer | ....................... | G01S 7/292 |
| 9,786,997 B2 * | 10/2017 | Schwengler | ......... | H01Q 1/2291 |
| 2012/0119960 A1* | 5/2012 | De Luca | ................ | G01R 29/10 343/703 |

* cited by examiner

*Primary Examiner* — Frank J McGue
(74) *Attorney, Agent, or Firm* — Womble Bond Dickinson (US) LLP

(57) ABSTRACT

An apparatus including an antenna and a processing device. The antenna includes a steerable array. The steerable array may transmit a signal at an angle of transmission toward a portion of an object. The steerable array may receive a reflection of the signal off of the portion of the object. The processing device may be coupled to the antenna. The processing device may determine a digital representation of the portion of the object in view of the reflection of the signal.

17 Claims, 3 Drawing Sheets

ARRAY SYSTEM FOR THE CHARACTERIZATION OF AN OBJECT

BACKGROUND

The horticultural industries produce a variety of crops including bedding plants, foliage plants, flowering plants, nursery stock, fruit plants, vegetable plants, and so forth. In vascular plants, a root is the organ of a plant that typically lies below the surface of the soil. Root growth and development may be central to an overall plant performance and growth.

BRIEF DESCRIPTION OF THE DRAWINGS

The present disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Rhizometrics is the study, characterization, observation, and quantification of plant root growth and root systems. Root growth and root systems may indicate a health of a plant and a future performance of a plant to yield fruits or vegetables. A timing and development of the root structure may also indicate a response of the plant to different soils, fertilizers, moisture levels, air temperatures, and soil temperatures.

Conventionally, to examine the root growth and root systems of a plant, the plant may be dug up, the roots of the plant cleaned, and then the root structure may be analyzed. Digging up the plant may damage the roots or the body of the plant. Damage to the roots or the body of the plant may destroy or impede further development of the plant if the plant is returned to the soil. Additionally, manually digging up the plant, cleaning the roots, and analyzing the roots by manual inspection may be labor intensive and monotonous.

The present disclosure addresses the above-mentioned and other deficiencies by providing for an antenna structure that measures an absorption or reflection of signals by a root structure to determine the root growth and the root system of a plant. The antenna structure may include planar arrays that steer a direction of transmitted signals toward the root system of a plant. Receivers of the planar arrays may measure reflections or absorptions of the signals to determine the root system of the plant. An advantage of determining the root system of the plant using the antenna structure may be to non-invasively measure the root structure of the plant without removing the plant from the soil.

Figure 1A:
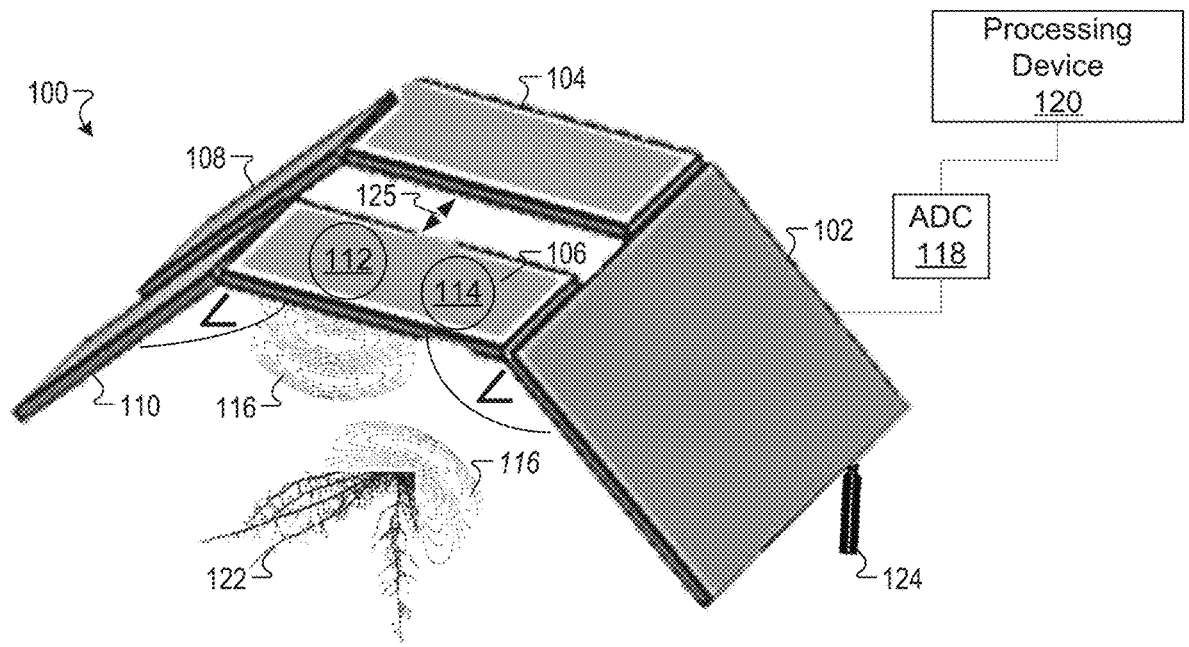
FIG. 1A illustrates an antenna structure that includes a first antenna array, a second antenna array, a third antenna array, a fourth antenna array, and a fifth antenna array, according to one implementation.

FIG. 1A illustrates an antenna structure 100 that includes a first antenna array 102, a second antenna array 104, a third antenna array 106, a fourth antenna array 108, and a fifth antenna array 110, according to one implementation. In one implementation, the first antenna array 102, the second antenna array 104, the third antenna array 106, the fourth antenna array 108, and the fifth antenna array 110 may be planar antenna arrays where the elements of each planar antenna array are on one plane. A planar antenna array may include a substrate, such as plastic or metal, with transmitters, receivers, and other components integrated into the substrate. A planar array may provide an aperture and may be used for directional beam control by varying a relative phase of the element of the planar array. In one example, a planar array may include antenna elements that may produce a steerable main lobe of radio frequency (RF) energy. In another implementation, the first antenna array 102, the second antenna array 104, the third antenna array 106, the fourth antenna array 108, and the fifth antenna array 110 may be wide-band antennas with antenna elements that do not interfere with each other when they are in relatively close proximity. In another implementation, the first antenna array 102, the second antenna array 104, the third antenna array 106, the fourth antenna array 108, and the fifth antenna array 110 may be steerable arrays with antenna elements that do not interfere with each other when they are in relatively close proximity.

The first antenna array 102 may be connected to the second antenna array 104 and the third antenna array 106. The first antenna array 102 may be connected to the second antenna array 104 or the third antenna array 106 by a weld, a fastener, a hinge, adhesive, a rivet, and so forth. The first antenna array 102 may be connected to the second antenna array 104 or the third antenna array 106 at a defined angle. For example, the first antenna array 102 may be located on a first plane and the second antenna array 104 and the third antenna array 106 may be located on a second plane. The second plane may be at a defined angle relative to the first plane. For example, the second plane may be at approximately a 45-degree angle relative to the first plane. The second antenna array 104 and the third antenna array 106 may be coplanar and separated by a gap 125. The gap 125 may provide space for a portion of an object, such as a stalk or body of a plant.

The second antenna array 104 may be connected to the fourth antenna array 108 at a defined angle. For example, the second antenna array 104 may be located on the second plane and the fourth antenna array 108 may be located on a third plane. The third plane may be at a defined angle relative to the second plane. For example, the third plane may be at approximately a 45-degree angle relative to the second plane. The second antenna array 104 may be connected to the fourth antenna array 108 by a weld, a fastener, a hinge, adhesive, a rivet, and so forth.

The third antenna array 106 may be connected to the fifth antenna array 110 at a defined angle. For example, the third antenna array 106 may be located on the second plane and the fifth antenna array 110 may be located on the third plane. The third antenna array 106 may be connected to the fifth antenna array 110 by a weld, a fastener, a hinge, adhesive, a rivet, and so forth. The number of antenna arrays is not intended to be limiting, and the antenna structure 100 may include different numbers of antenna arrays to provide different degrees of granularity for measuring the object 122. In one example, as the number of the antenna arrays in the antenna structure 100 increases, the antenna structure 100 may make measurements from an increasing number of angles, which may increase the granularity of the measurements. In another example, the number of the antenna array in the antenna structure 100 may be based on the object the antenna structure 100 is being used to measure. For example, the antenna structure 100 may include the first antenna array 102, the second antenna array 104, the third antenna array 106, the fourth antenna array 108, and the fifth antenna array 110 to fit around a plant to measure a root structure of the plant, as discussed below.

The first antenna array 102, the second antenna array 104, the third antenna array 106, the fourth antenna array 108, and the fifth antenna array 110 may include transmitters and receivers. For example, the third antenna array 106 may include a transmitter 112 and a receiver 114. The transmitter 112 may transmit a signal 116 with a defined amplitude and phase toward an object 122. In one example, the signal 116 may have a frequency of 9.35 gigahertz (GHz). In another example, the signal 116 may have an amplitude between −40 dBm and −120 dBm and phase between 0 and 360 degrees. In one implementation, the object 122 may be a plant, such as a potted plant, a farm crop, or a plant in a garden. In another implementation, the object 122 may be a fossil that is part of an archeological dig, such as a dinosaur bone.

The object 122 may reflect at least a portion of the signal 118 back toward the third antenna array 106. The third antenna array 106 may include a receiver 114 that may receive the reflection of the signal 116. The antenna structure 100 may be coupled to an analog to digital converter (ADC) 118. The ADC 118 may convert the signal 116 into a digital signal. For example, the ADC 118 may convert the signal 116 from a voltage or current measurement into a digital number proportional to the magnitude of the voltage or current. The ADC 118 may be coupled to a processing device 120. The ADC 118 may send the digital signal to a processing device 120. The processing device 120 may determine a phase or amplitude of the signal 116 when it was received at the receiver 114.

In one example, the processing device 120 may determine a difference between the amplitude and phase of the signal 116 when it is transmitted by the transmitter 112 and the amplitude and phase of the signal 116 when it is reflected and received by the receiver 114. In another example, the processing device 120 may determine a structure of the object 122 associated with the amplitude and phase of the signal 116. For example, the object 122 may be a root structure of a plant. The processing device 120 may use the amplitude and phase of the signal 116 that is received at the receiver 114 to generate a digital representation of the root structure. For example, a range is generated by mixing a frequency modulated transmit signal with a return signal and then examining the low frequency mixing products to calculate range. The received signal strength intensity (RSSI) may be combined with the azimuth and elevation angle of the phased arrays to generate the location in a spherical reference frame with a radius equal the range information. Information may also be determined using heuristics and a topology to generate discrete components that may represent a root structure.

In one implementation, the processing device 120 may use a heuristic processing technique to generate the digital representation of the root structure. For example, the processing device 120 or a memory coupled to the processing device 120 may store one or more template digital representations of root structures for different plants. The processing device 120 may receive a message indicating a type of plant for the root structure being measured and may select the template digital representation of the root structure associated with that plant. The processing device 120 may then update or modify the template digital representation to incorporate or modify the template digital representation to include the root structure measurements taken by the antenna arrays.

In another implementation, the processing device 120 may use a pattern recognition processing technique to generate the digital representation of the root structure. For example, the processing device 120 may initially generate the digital representation of the root structure. The processing device 120 may then analyze the initial digital representation of the root structure for patterns in the root structure. When the initial digital representation of the root structure has missing or incomplete portions in the digital representation, the processing device 120 may fill in the missing or incomplete portions using pattern recognition. The processing device 120 may also use a template digital representation of the root structure and compare it to the initial digital representation to identify similar patterns in between the template digital representation and the initial digital representation. The processing device 120 may use the identified patterns to fill in the missing or incomplete portions of the digital representation of the root structure.

In one example, the processing device 120 may use the digital representation of the root structure to determine a number of root elements in the root structure, a size of the root elements in the root structure, a diameter of the individual root elements in the root structure, a physical topography of the root structure, a branching angle of the root elements, or a topological depth of the root elements. The number, size, diameter, and topology of the root elements may indicate the growth and development characteristics of the root elements. In another example, the processing device 120 may use the digital representation of the root structure to determine the root growth and root development of the root structure. The growth and development characteristics of the root elements may indicate a response of the plant to different soils, fertilizers, moisture levels, air temperatures, and soil temperatures.

The processing device 120 may use the digital representation of the root structure to calculate a root mass of the root structure. The root mass may indicate a biomass of the root structure, which may indicate a carbon sequestration of the root structure.

The signals transmitted by the transmitters of the first antenna array 102, the second antenna array 104, the third antenna array 106, the fourth antenna array 108, and the fifth antenna array 110 may be steerable. For example, the third antenna array 106 may include one or more antenna elements which produce a main lobe of radio frequency (RF)

energy. The main lobe of the RF energy (also referred to as a beam) may be steerable to transmit signals toward the object 122, such as the root structure of the plant, from different positions and angles and then receive the reflected signals for the different positions and angles. In one example, the antenna arrays may change a direction or radiation pattern of the beam transmitted by the transmitters of the antenna arrays. In one implementation, the antenna arrays may steer the beam by switching elements of the antenna arrays on or off. In another implementation, the antenna arrays may steer the RF energy by changing the relative phases of the RF signals driving the elements of the antenna arrays.

The processing device 120 may electronically steer the RF energy transmitted by an antenna array to probe or examine different portions of the object 122 or the area approximate the object 122. For example, the processing device 120 may steer the RF energy of an antenna array to sweep a defined area to determine the root structure of a plant within the defined area. In this example, the processing device 120 may use the antenna array to take multiple measurements as it steers the RF energy and then aggregates the multiple measurements to generate an aggregate digital representation of the root structure. In another example, the processing device 120 may iteratively steer a transmission of a sequence of signals from the third antenna array 106 at toward different portions of the object 122. The processing device 120 may receive reflections of the sequence of signals off of the different portions of the object 122 and determine a digital representation of the object 122 by aggregating the reflections of the sequence of signals.

The processing device 120 may aggregate the signals received by the receivers of the first antenna array 102, the second antenna array 104, the third antenna array 106, the fourth antenna array 108, and the fifth antenna array 110 to generate the digital representation of the root structure. In one implementation, the first antenna array 102 may send and receive signals from the different positions and angles. For example, the first antenna array 102 may steer a transmitted signal to sweep across a defined area to take an aggregated set of measurements that approximately covers the defined area. The second antenna array 104, the third antenna array 106, the fourth antenna array 108, and the fifth antenna array 110 may also transmit signals at different positions and angles to sweep defined areas to take an aggregated set of measurements that approximately covers the defined areas. The positions and angles of the signals transmitted by the first antenna array 102, the second antenna array 104, the third antenna array 106, the fourth antenna array 108, and the fifth antenna array 110 may be known or predefined values stored at the processor. The processor may aggregate the various sets of measurements to generate the digital representation of the root structure.

In one implementation, other particles and objects may interfere with measuring the object 122. For example, when the object 122 is a root system, different characteristics of the soil where the roots are located may interfere with the measurement of the roots. To calibrate for the different soil characteristics, the antenna structure 100 may include a probe 124. The probe 124 may be an RF target inserted into a medium, such a ground, underneath. In one implementation, the probe 124 may be manually inserted and removed from the ground by an individual. In another implementation, the probe 124 may be automatically extended and retracted by the antenna structure 100. For example, the processing device 120 may engage a mechanical actuator to extend or retract the probe 124.

The probe 124 may have known absorption and reflective values for signals transmitted at the probe 124 by the transmitters of the first antenna array 102, the second antenna array 104, the third antenna array 106, the fourth antenna array 108, and the fifth antenna array 110. For example, the probe 124 may be a material with a known absorption and reflection properties for the transmitted signal, such as a ceramic material. The processing device 120 may transmit one or more calibration signals from the transmitters of the first antenna array 102, the second antenna array 104, the third antenna array 106, the fourth antenna array 108, and the fifth antenna array 110 toward the probe 124. The processing device 120 may then measure the amplitude and phase of the signal that is reflected by the probe 124. The processing device 120 may then compare an expected amplitude and phase (also referred to herein as an expected reflection) of the signal when there is no interference or noise with the actual amplitude and phase of the signal when it is transmitted through the soil to the probe 124 to determine the interference or noise caused by the soil and obtain calibration measurement. The interference by the soil may include permittivity and attenuation characteristics of the soil. For example, the permittivity of the soil may enable more or less water to be retained in the soil. As the amount of water retained in the soil increase, the interference to the signal also increases.

The processing device 120 may then calibrate the signals reflected by the object 122 to account for the interference caused by the soil using the calibration measurement. For example, when the first antenna array 102, the second antenna array 104, the third antenna array 106, the fourth antenna array 108, or the fifth antenna array 110 transmits a signal toward the object 122 and receives a reflected signal, the processing device 120 may determine an increase or decrease in the amplitude and phase of the signal caused by the soil and filter out that interference in the signal.

To determine the digital representation of the root structure, the processing device 120 may use a wavelet transformation in order to produce a geometric representation of the root structure in a digital format. A wavelet is a function to divide a signal into different components, such as amplitude and phase components. The wavelet transformation is a function that uses the wavelet in digital signal processing to generate a digital representation of the wavelets. The removing of the interference from the signal may increase a range, resolution, and accuracy of the digital representation of the amplitude and phase of the signals.

Figure 1B:
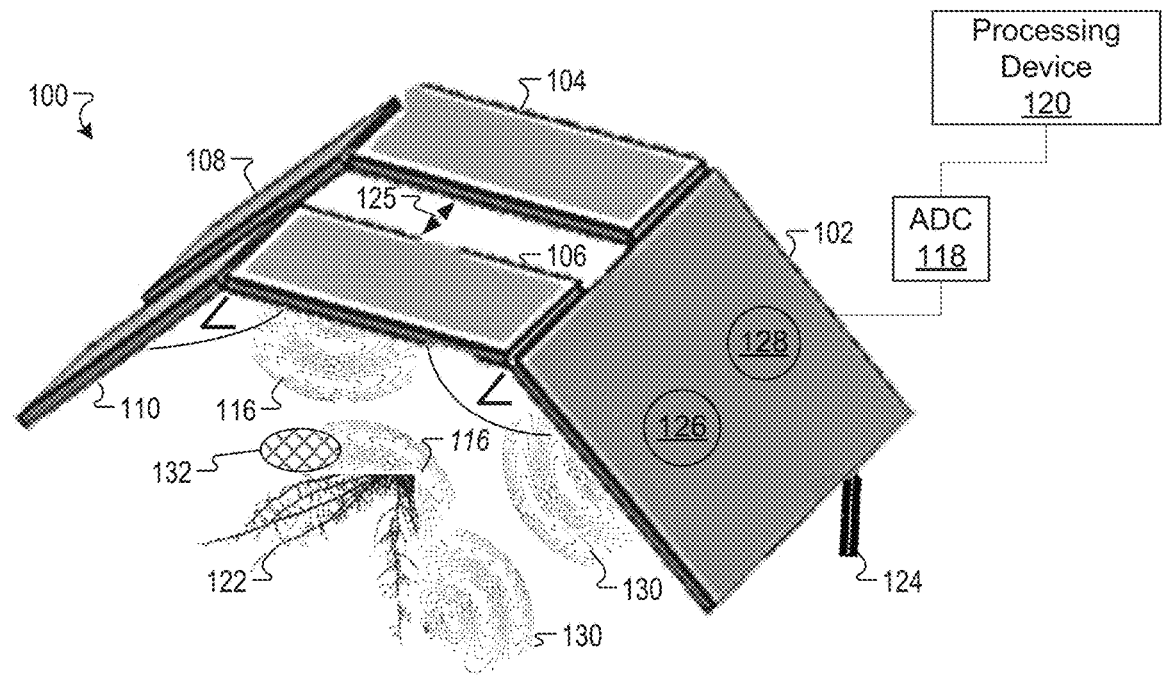
FIG. 1B illustrates an antenna structure that transmits a first signal from the first antenna array and a second signal from the third antenna array, according to one implementation.

FIG. 1B illustrates an antenna structure 100 that transmits a first signal 130 from the first antenna array 102 and a second signal 116 from the third antenna array 106, according to one implementation. Some of the features in FIG. 1B are the same or similar to the some of the features in FIG. 1A as noted by same reference numbers, unless expressly described otherwise.

As discussed above, the antenna structure 100 may include the first antenna array 102, the second antenna array 104, the third antenna array 106, the fourth antenna array 108, and the fifth antenna array 110. The first antenna array 102 may include a transmitter 126 and a receiver 128. The transmitter 126 may transmit a first signal 130 toward the object 122. The receiver 128 may receive a reflection of the first signal 130 off of the object 122. The third antenna array 106 may include the transmitter 112 and the receiver 114. The transmitter 112 may transmit the second signal 116 toward the object 122. The receiver 114 may receive a reflection of the second signal 116 off of the object 122. The ADC 118 may convert the first signal 130 and the second signal 116 into digital values and send the digital values to the processing device 120. The processing device 120 may aggregate the digital values and generate a digital representation of the object 122, as discussed above.

Aggregating the digital values of multiple signals from the first antenna array 102, the second antenna array 104, the third antenna array 106, the fourth antenna array 108, and the fifth antenna array 110 may increase an accuracy of the digital representation of the object 122 because the first antenna array 102, the second antenna array 104, the third antenna array 106, the fourth antenna array 108, and the fifth antenna array 110 transmit signals from different locations and at different angles. The different location and angles of transmission of the signals may provide unique signal information from the signals that the processing device 120 may aggregate to get a complete representation of the object 122. For example, the first antenna array 102 may transmit a first signal toward the portion of the object 122 at a first angle of transmission. The second antenna array 104 may transmit a second signal toward the portion of the object 122 at a second angle of transmission. The third antenna array 106 may transmit a third signal toward the portion of the object 122 at a third angle of transmission. The fourth antenna array 108 may transmit a fourth signal toward the portion of the object 122 at a fourth angle of transmission. The fifth antenna array 110 may transmit a fifth signal toward the portion of the object 122 at a fifth angle of transmission.

The processing device 120 may also use the multiple signals to correct errors in the digital representation of the object 122. For example, an interfering object 132 may be located approximate to the object 122. The interfering object 132 may be a rock, water, and so forth. The interfering object 132 may at least partially interfere with the second signal 116 reflecting off the object 122. The interference from the object 132 may interfere with the second signal 116 and cause the amplitude and the phase of the second signal 116 to be incorrect. The incorrect amplitude and phase of the reflected second signal 116 may introduce errors into a digital representation of the object 122. The first signal 130 may be transmitted by the first antenna array 102 from a different angle and a different location. The first signal may not encounter the interfering object 132 and may not have interference from the interfering object 122 in the amplitude and phase of the reflected first signal 130. When the processing device 120 receives the digital values associated with the first signal 130 and the second signal 116, the processor may determine that the digital values for the first signal 130 differ from the digital values of the second signal 116 by a threshold amount. The difference in the digital values may indicate that there is an interfering object 132 that is causing the difference.

In one implementation, the processing device 120 may filter out the digital values for the second signal 116 when the digital values are outside an expected range. In another implementation, when the processing device 120 receives digital values from multiple antenna arrays, the processing device 120 may compare the digital values to determine if one or more of the digital values are an outlier. When one of the digital values is an outlier, the processing device 120 may remove the digital value from the aggregated digital values used to generate the digital representation of the object 122. For example, each of the first antenna array 102, the second antenna array 104, the third antenna array 106, the fourth antenna array 108, and the fifth antenna array 110 may send signals toward the object 122 and receive reflected signals. The processing device 120 may receive digital values associated with each of the reflected signals. When the digital values from the second antenna array 104, the third antenna array 106, the fourth antenna array 108, and the fifth antenna array 110 are within a threshold range and the digital value from the first antenna array 102 is outside the threshold range, the processing device 120 may remove the digital value for the first antenna array 102 from the aggregate digital values from the first antenna array 102, the second antenna array 104, the third antenna array 106, the fourth antenna array 108, and the fifth antenna array 110.

Figure 2:
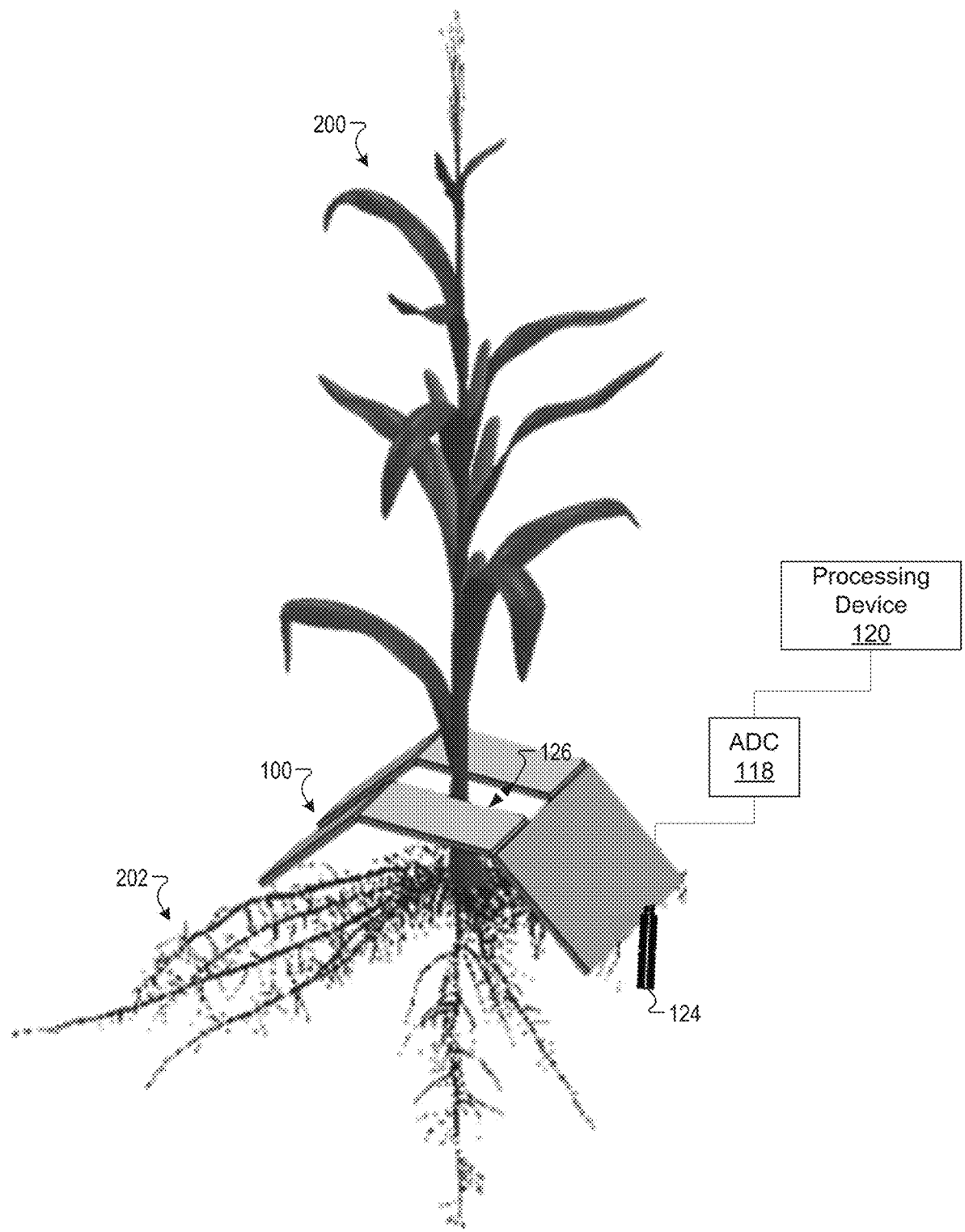
FIG. 2 illustrates the antenna structure of FIG. 1 placed around a plant to measure a root structure of the plant, according to one implementation.

FIG. 2 illustrates the antenna structure 100 of FIG. 1 located around a plant 200 to measure a root structure 202 of the plant 200, according to one implementation. Some of the features in FIG. 2 are the same or similar to the some of the features in FIG. 1A as noted by same reference numbers, unless expressly described otherwise.

The antenna structure 100 may be placed around the plant 200 so that the processing device 120 may measure the root structure 202 of the plant 200 using the antenna structure 100, as discussed above. To place the antenna structure 100 around the plant 200, the plant 200 may be placed within the gap 125 in the antenna structure 100. In one example, the plant 200 may be a potted plant. In another example, the plant 200 may be a farm crop or a plant in a garden.

When the plant 200 is located within the gap 125, the antenna structure 100 may be arranged around the plant to transmit signals from the first antenna array 102, the second antenna array 104, the third antenna array 106, the fourth antenna array 108, and the fifth antenna array 110 toward the root structure 202. The processing device 120 may use digital values from the reflections of the signals to generate a digital representation of the root structure 202, as discussed above.

The processing device 120 may use the antenna structure 100 to monitor the root structure 202 periodically, on a regular basis, or continuously. For example, the processing device 120 may use the antenna structure 100 to take a measurement of the root structure 202 and generate a digital representation of the root structure 202 on a daily basis. The processing device 120 may monitor the development and growth of the root elements of the root structure to determine a developmental progress of the plant 200 over a period of time. The developmental progress of the plant 200 may be monitored over a propagation stage of the plant 200, a production state of the plant 200, and/or a post-production state of the plant 200. The developmental progress of the plant 200 may indicate anchoring of the root structure 202, a support of the root structure 202, and water and nutrient uptake of the root structure 202. In one example, the root elements may be 1.9 millimeters (mm) in diameter and 50 mm long.

Figure 3:
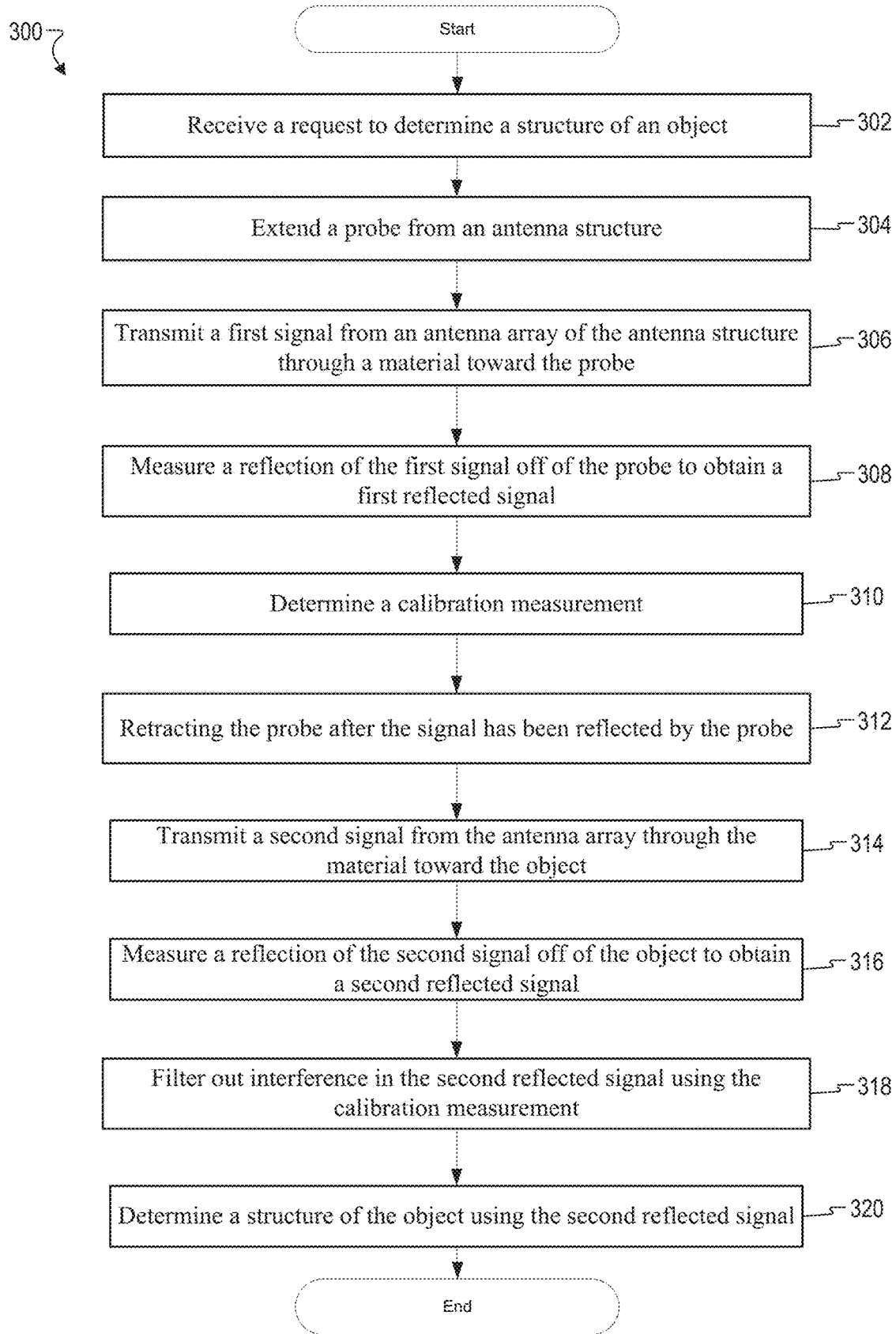
FIG. 3 illustrates a flowchart of the method for generating a digital representation of an object, according to one implementation.

FIG. 3 illustrates a flowchart of the method 300 for generating a digital representation of an object, according to one implementation. The method 300 may at least partially be performed by processing logic that includes hardware (e.g., circuitry, dedicated logic, programmable logic, microcode, etc.), software (e.g., instructions executed by a processing device), firmware or a combination thereof. In one embodiment, the method 300 may be performed by all or part of the processing device 120 of FIGS. 1A and 1B.

Referring to FIG. 3, the method 300 begins with a processor receiving a request to determine a structure of an object (block 302). For example, the processor may receive a request to determine a root structure of a plant. The method may include extending a probe from an antenna structure (block 304). The method may include transmitting a first signal from an antenna array of the antenna structure through a material toward the probe (block 306). For example, the antenna array may transmit the first signal through dirt toward the probe. The method may include measuring a reflection of the first signal off of the probe to obtain a first reflected signal (block 308).

The method may include determining a calibration measurement in view of the first reflected signal (block 310). For example, the probe may be a material with known absorption and reflection properties. The processor may transmit one or more signals from the transmitters of the antenna array. The processor may then measure an amplitude and phase of the signal that is reflected by the probe. The processor may then compare an expected amplitude and phase of the signal when there is no interference with the actual amplitude and phase of the signal when it is transmitted through the soil to the probe to determine the interference caused by the soil.

The method may include retracting the probe after the signal has been reflected by the probe (block 312). The method may include the processor transmitting a second signal through the material toward the object (block 314). The method may include the processor measuring a reflection of the second signal off of the object to obtain a second reflected signal (block 316). The method may include the processor filtering out interference in the second reflected signal using the calibration measurement (block 318). The method may include determining a structure of the object using the second reflected signal (block 320). In one example, the processor may use a heuristic to determine a structure of the object, as discussed above.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

The terms "over," "above" "under," "between," and "on" as used herein refer to a relative position of one material layer or component with respect to other layers or components. For example, one layer disposed above or over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into many other different systems of applications. Various presently unforeseen or unanticipated alternatives, modifications, variations, or improvements therein may be subsequently made by those skilled in the art which are also intended to be encompassed by the following claims.

What is claimed is:

1. An apparatus comprising:
   an antenna comprising a first steerable array, a second steerable array, a third steerable array, and a fourth steerable array, the antenna to:
      transmit, via the first steerable array, a first signal at a first angle of transmission toward a first portion of a first object;
      transmit, via the second steerable array, a second signal at a second angle of transmission toward the first portion of the first object;
      transmit, via the third steerable array, a third signal at the second angle of transmission toward the first portion of the first object;
      transmit, via the fourth steerable array, a fourth signal at a third angle of transmission toward the first portion of the first object; and
      receive a reflection of the first signal, the second signal, the third signal, and the fourth signal off of the first portion of the first object; and
   a processing device coupled to the antenna, the processing device to determine a digital representation corresponding to a structure of the first portion of the first object in view of the reflection of the first signal, the second signal, the third signal, and the fourth signal.

2. The apparatus of claim 1, wherein to determine the digital representation of the first portion of the first object, the processing device is to:
   determine a phase and an amplitude of the reflection of the first signal; and
   determine the digital representation of the first portion of the first object in view of the phase and the amplitude of the reflection of the first signal.

3. The apparatus of claim 1, wherein
   the first steerable array is further to:
      iteratively steer transmissions of a sequence of signals at toward different portions of the first object; and
      receive reflections of the sequence of signals off of the different portions of the first object; and
   the processing device is further to determine the digital representation of the first object in view of an aggregation of the reflections of the sequence of signals.

4. The apparatus of claim 1, wherein:
   the first steerable array is further to:
      transmit a fifth signal at a fourth angle of transmission toward a second portion of the first object; and
      receive a reflection of the fifth signal off of the second portion of the first object; and
   the processing device is further to determine a digital representation of the second portion of the first object in view of the reflection of the second signal.

5. The apparatus of claim 4, wherein the processing device is further to aggregate the digital representation of the first portion of the first object with the digital representation of the second portion of the first object to obtain a digital representation of the first portion and the second portion of the first object.

6. The apparatus of claim 1, wherein the processing device is further to:
compare a phase and an amplitude of the reflection of the first signal to a phase and an amplitude of the reflection of the second signal to identify interference in the first signal; and
filter out the interference in the reflection of the first signal.

7. The apparatus of claim 6, wherein the interference is caused by a second object located between the first steerable array and the first object.

8. The apparatus of claim 1, wherein the antenna comprises one or more additional steerable arrays, wherein the one or more additional steerable arrays transmit signals toward the first portion of the first object at different angles of transmission.

9. An apparatus comprising:
an antenna comprising a first steerable array, a second steerable array, a third steerable array, and a fourth steerable array, the antenna to:
transmit, via the first steerable array, a first signal at a first angle of transmission toward a first portion of an object;
transmit, via the second steerable array, a second signal at a second angle of transmission toward the first portion of the object;
transmit, via the third steerable array, a third signal at the second angle of transmission toward the first portion of the first object;
transmit, via the fourth steerable array, a fourth signal at a third angle of transmission toward the first portion of the first object; and
receive a reflection of the first signal, the second signal, the third signal, and the fourth signal off of the first portion of the object; and
a processing device coupled to the antenna, the processing device to determine a digital representation corresponding to a structure of the first portion of the object in view of the reflection of the first signal, the second signal, the third signal, and the fourth signal.

10. The apparatus of claim 9, further comprising a probe connected to the antenna, wherein:
the first steerable array is to:
transmit a calibration signal through a material toward the probe; and
receive a reflection of the calibration signal off of the probe; and
the processing device is to:
determine a calibration measurement in view of the reflection of the calibration signal; and
adjust the digital representation of the first portion of the object in view of the calibration measurement.

11. The apparatus of claim 10, wherein the probe has defined reflection characteristics and the processing device is to compare an expected reflection of the calibration signal with the calibration signal reflected off of the probe to determine the calibration measurement.

12. The apparatus of claim 9, wherein the antenna comprises one or more additional steerable arrays, wherein the one or more additional steerable arrays transmit signals toward the first portion of the object at different angles of transmission.

13. The apparatus of claim 12, wherein the second steerable array and the third steerable array of the one or more additional steerable arrays are coplanar and there is a gap between the second steerable array and the third steerable array to provide a space for a second portion of the object.

14. The apparatus of claim 13, wherein the object is a plant, and wherein the first portion of the object is a portion of a root structure of the plant and the second portion of the object is a stalk of the plant.

15. A method comprising:
transmitting a first signal from a first steerable array of an antenna structure at a first angle toward a first portion of an object;
transmitting a second signal from a second steerable array of the antenna structure at a second angle toward the first portion of the object;
transmitting a third signal from a third steerable array of the antenna structure at the second angle toward the first portion of the first object;
transmitting a fourth signal from a fourth steerable array of the antenna structure at a third angle toward the first portion of the first object;
receiving a reflection of the first signal, the second signal, the third signal, and the fourth signal off of the first portion of the object;
determining, by a processing device, an amplitude of the reflection of the first signal, the second signal, the third signal, and the fourth signal; and
determining, by the processing device, a first digital representation of a structure of the first portion of the object in view of the amplitude of the reflection of the first signal, the second signal, the third signal, and the fourth signal.

16. The method of claim 15, further comprising:
receiving, by the processing device, a request to determine a structure of the object;
extending a probe from the antenna structure;
transmitting, by the antenna structure, a calibration signal from the antenna structure through a material toward the probe;
measuring a reflection of the calibration signal off of the probe;
determining, by the processing device, a calibration measurement in view of the reflection of the calibration signal; and
adjusting, by the processing device, the amplitude of the reflection of the first signal using the calibration measurement to remove interference in the measurement signal caused by the material.

17. The method of claim 15, further comprising:
transmitting a second measurement signal from the antenna structure toward a second portion of the object;
receiving a reflection of the second measurement signal off of the second portion of the object;
determine, by the processing device, an amplitude of the reflection of the second measurement signal;
determining, by the processing device, a second digital representation of a structure of the second portion of the object in view of the amplitude of the reflection of the second measurement signal; and
aggregating, by the processing device, the first digital representation and the second digital representation to determine a third digital representation of the first portion and the second portion of the object.

* * * * *